United States Patent
Das et al.

(10) Patent No.: US 10,275,296 B2
(45) Date of Patent: Apr. 30, 2019

(54) METHOD AND SYSTEM FOR RESOLVING ONE OR MORE ERRORS IN AN ENTERPRISE STORAGE SYSTEM

(71) Applicant: Wipro Limited, Bangalore (IN)

(72) Inventors: Rishav Das, Howrah (IN); Karanjit Singh, Tarn-Taran (IN)

(73) Assignee: Wipro Limited, Bangalore (IN)

( * ) Notice: Subject to any disclaimer, the term of this patent is extended or adjusted under 35 U.S.C. 154(b) by 111 days.

(21) Appl. No.: 15/461,607

(22) Filed: Mar. 17, 2017

(65) Prior Publication Data

US 2018/0210778 A1 Jul. 26, 2018

(30) Foreign Application Priority Data

Jan. 24, 2017 (IN) .............................. 201741002739

(51) Int. Cl.
  *G06F 11/00* (2006.01)
  *G06F 11/07* (2006.01)
  *G06F 11/14* (2006.01)

(52) U.S. Cl.
  CPC ........ *G06F 11/0727* (2013.01); *G06F 11/079* (2013.01); *G06F 11/0793* (2013.01);
  (Continued)

(58) Field of Classification Search
  CPC .............. G06F 11/0727; G06F 11/079; G06F 11/0793; G06F 11/1402; G06F 11/1438; G06F 11/1441
  See application file for complete search history.

(56) References Cited

U.S. PATENT DOCUMENTS

| | | | |
|---|---|---|---|
| 10,061,663 B2* | 8/2018 | Vijayan ............... | G06F 11/1662 |
| 2009/0106601 A1* | 4/2009 | Ngai ................... | G06F 11/0748 |
| | | | 714/39 |

(Continued)

FOREIGN PATENT DOCUMENTS

WO   WO 00/65448   11/2000

OTHER PUBLICATIONS

Extended European Search Report issued in the European Patent Office in counterpart European Application No. 17163351.4, dated Oct. 10, 2017, 8 pages.

(Continued)

*Primary Examiner* — Joshua P Lottich
(74) *Attorney, Agent, or Firm* — Finnegan, Henderson, Farabow, Garrett & Dunner, LLP

(57) ABSTRACT

Disclosed herein is a method and system for resolving one or more errors in an enterprise storage system. The resolution system receives one or more alerts from a management server configured in the enterprise storage system, wherein the one or more alerts are associated with an error in a storage array configured in the enterprise storage system. Upon receiving the one or more alerts, verifying one or more parameters associated with at least one alert from the one or more alerts, using data stored in an internal database configured in the resolution system. Further, storing a data associated with the one or more parameters in a memory, configured in the resolution system, after verifying the one or more parameters. Finally, resolving the error after identifying one or more corresponding root causes from the data associated with the one or more parameters, using one or more error resolving processes.

17 Claims, 7 Drawing Sheets

(52) U.S. Cl.
CPC ...... *G06F 11/1402* (2013.01); *G06F 11/1438* (2013.01); *G06F 11/1441* (2013.01)

(56) References Cited

U.S. PATENT DOCUMENTS

| | | | |
|---|---|---|---|
| 2009/0128323 A1* | 5/2009 | Milbar | G08B 27/008 340/539.1 |
| 2010/0257412 A1 | 10/2010 | Acuna et al. | |
| 2011/0302192 A1* | 12/2011 | Bariska, Jr. | G06F 11/0748 707/769 |
| 2015/0271008 A1* | 9/2015 | Jain | H04L 41/0686 714/57 |
| 2015/0280968 A1 | 10/2015 | Gates et al. | |
| 2017/0193003 A1* | 7/2017 | Vijayan | G06F 11/1662 |
| 2017/0249199 A1* | 8/2017 | Tripathi | G06F 11/079 |
| 2018/0034686 A1* | 2/2018 | Vaidyanathan | H04L 41/0677 |

OTHER PUBLICATIONS

White Paper, "High Availability, Data Protection and Data Integrity in the XtremIO Architecture", Apr. 2015, *EMC²*, pp. 1-28.

* cited by examiner

METHOD AND SYSTEM FOR RESOLVING ONE OR MORE ERRORS IN AN ENTERPRISE STORAGE SYSTEM

FIELD OF THE DISCLOSURE

The present subject matter is related, in general to enterprise storage systems, and more particularly, but not exclusively to a method and a system for resolving at least one error in an enterprise storage system.

BACKGROUND

Generally, a storage area network (SAN) is a dedicated high-speed network which interconnects and provides a shared pool of storage devices to multiple servers. The SAN is primarily used to enhance performance of the storage devices, as they appear as a single device locally attached to the servers, which is centrally managed. All SAN storage systems include one or more management servers which are responsible for generating alert in case of any error or failure in the storage system. After an alert is generated, the management server generates a ticket, which is a service request one of, but not limited to, S1, S2 and S3. The type of service request, any of S1, S2 and S3, depends on the criticality of the alert. Also, these service requests upon notification are handled manually by engineers. Therefore, the time gap between the alert generation and resolution of errors is more.

A conventional error resolution method in SAN storage is time consuming. Also, the conventional error resolution method requires an engineer to work continuously, to provide resolution to the service requests based on the criticality of the alert. This also increases the overall cost involved in the maintenance required for the storage systems. Further, in case of any critical situation of Data Unavailability (DU)/Data Loss (DL), an immediate resolution of the error is required. In such scenario, manual error resolution process being time consuming may lead to high data loss or data unavailability.

In the present scenario of SAN storage systems, there is always a possibility that an engineer working on the resolution may run a wrong script or a wrong command, which may further lead to data unavailability and deactivation of the SAN environment for a significant time duration. Also, there is a chance of fake alerts being generated, resulting into unnecessary ticket generation.

SUMMARY

Disclosed herein is a method for resolving at least one error in an enterprise storage system. The method comprises receiving, by a resolution system, one or more alerts from a management server configured in the enterprise storage system, wherein the one or more alerts are associated with an error in a storage array configured in the enterprise storage system. Upon receiving the one or more alerts, verifying one or more parameters associated with at least one alert from the one or more alerts, using data stored in an internal database configured in the resolution system. Further, storing a data associated with the one or more parameters in a memory, configured in the resolution system, after verifying the one or more parameters. Finally, resolving the error after identifying one or more corresponding root causes from the data associated with the one or more parameters, using one or more error resolving processes.

Further, the present disclosure discloses a resolution system for resolving one or more errors in an enterprise storage system. The resolution system comprises a processor and a memory. The memory may be communicatively coupled to the processor, wherein the memory stores processor-executable instructions. The instruction, upon execution causes the processor to receive one or more alerts from a management server configured in the enterprise storage system, wherein the one or more alerts are associated with an error in a storage array configured in the enterprise storage system. Upon receiving the one or more alerts, verify one or more parameters associated with at least one alert from the one or more alerts, using data stored in an internal database configured in the resolution system. Further, store data associated with the one or more parameters in a memory, configured in the resolution system, after verifying the one or more parameters. Finally, resolve the error after identifying one or more corresponding root causes from the data associated with the one or more parameters, using one or more error resolving processes.

Furthermore, the present disclosure discloses a non-transitory computer readable medium including instructions stored thereon that when processed by at least one processor cause a resolution system to perform acts of receiving one or more alerts from a management server configured in the enterprise storage system, wherein the one or more alerts are associated with an error in one of plurality of storage arrays configured in the enterprise storage system. Also, verifying one or more parameters associated with at least one alert from the one or more alerts, using data stored in an internal database configured in the resolution system. After verifying the one or more parameters, storing data associated with the one or more parameters in a memory, configured in the resolution system. Further, resolving the error after identifying one or more corresponding root causes from the data associated with the one or more parameters, using one or more error resolving processes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
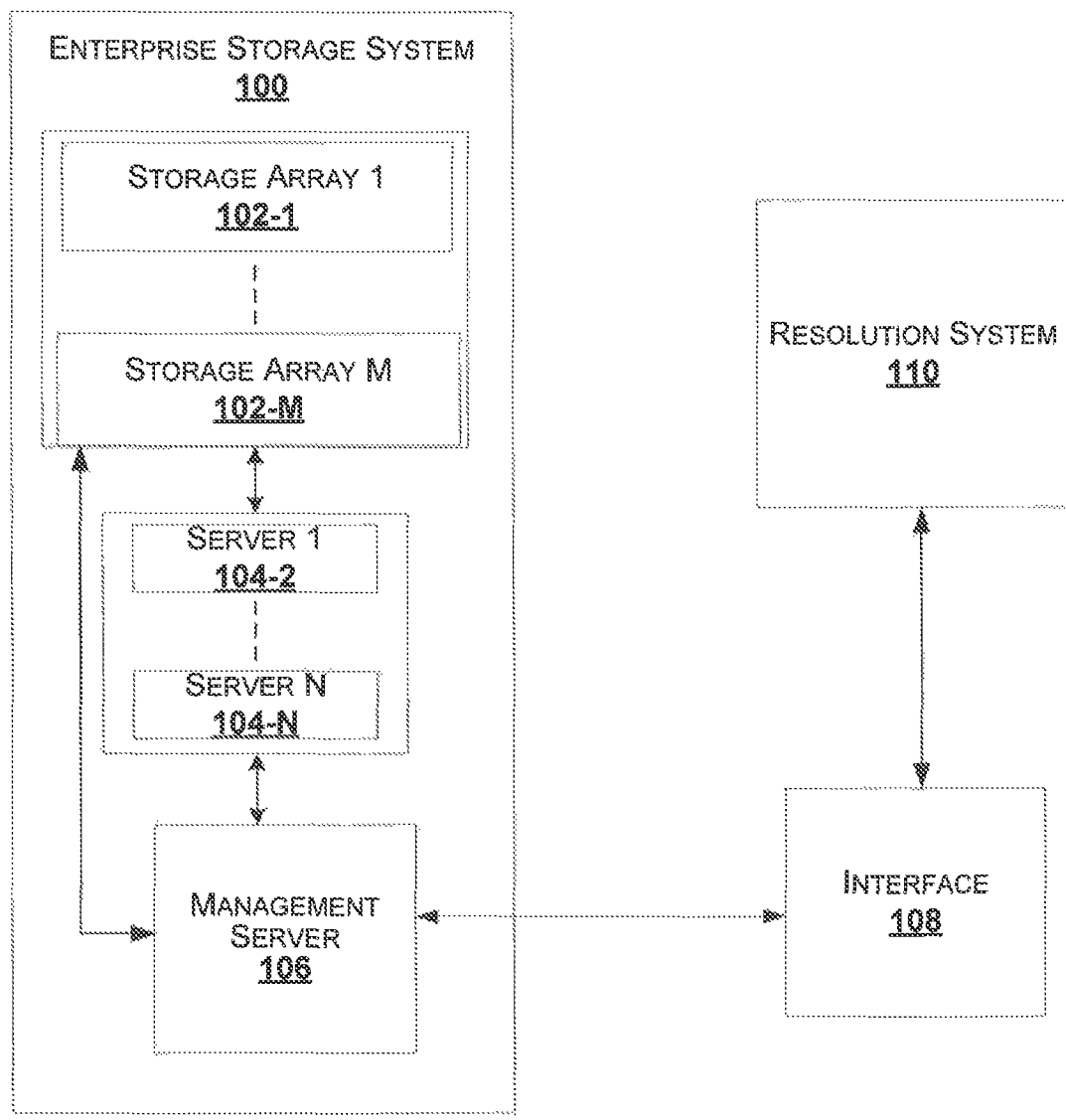
FIG. 1 shows an exemplary environment for resolving one or more errors in an enterprise storage system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown or not.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a resolution system for resolving at least one error in an enterprise storage system. The resolution system is configured to receive alerts from a management server, configured in the enterprise storage system. The alerts are associated with an error in a storage array configured in the enterprise storage system. The resolution system verifies one or more parameters associated with the alerts, using data stored in an internal database configured in the resolution system. Also, the resolution system stores data associated with the one or more parameters in a memory, after verifying the one or more parameters. Thereafter, the resolution system uses one or more error resolving processes to identify root causes from the data associated with the one or more parameters and resolve the error.

The error which is identified by the resolution system is one of software error and hardware error associated with the storage array. If there is a software error, then one of the error resolving processes is initiated, which performs one of running a script to resolve the error and informing a customer about the error. If, the error is not resolved, next error resolving process is initiated, which checks and investigates whether any part of a component needs to be replaced or a disconnection has happened. The error resolving process performs one of rebooting/restarting of the storage array and sending information about the error to the customer. If still the error is unresolved, then the last error resolving process is initiated, which transmits information associated to the error such as, but not limited to, log files to an engineer, for resolving the error.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for resolving one or more errors in an enterprise storage system using a resolution system.

An enterprise storage system (ESS) 100 is a centralized repository for business information that provides common data management and protection, as well as data sharing functions, through connections to numerous computer systems. A storage area network is an essential feature of the enterprise storage system 100. A storage area network (SAN) is a dedicated high-speed network which interconnects and presents shared pool of storage devices to multiple servers, and is primarily used to enhance performance of the storage devices as they appear as a single device locally attached to servers, which is centrally managed. All SAN storage systems include management servers which are responsible for generating alert in case of any error or failure in the storage system.

In an embodiment, the ESS 100 may be associated with a plurality of storage arrays 102-1, 102-2, . . . , 102-M, together the plurality of storage arrays is referred as storage arrays 102; plurality of servers 104-1, 104-2, . . . 104-N and a management server 106. The exemplary environment for resolving one or more errors in an enterprise storage system 100 is performed by a resolution system 110. The resolution system 110 is connected to the management server 106, configured in the enterprise storage system 100, through an I/O interface 108. In an embodiment, the plurality of servers 104-1, 104-2, . . . , 104-N associated with the ESS 100 may be a webserver, for example, Apache® webserver, WebSphere application server or Microsoft® Internet Information Server (IIS), that provides an access to one or more applications being developed in the ESS 100.

In one embodiment, the resolution system 110 is an automated computing system which is used to resolve at least one of hardware and software issues in one of the plurality of storage arrays 102-1, 102-2, . . . , 102-M. The resolution system 110 comprises at least one processor, which may be two quadcore IVY bridge processors, in one embodiment. The kernel or operating system of the resolution system 110 resides on the at least one processor.

Each of the storage arrays 102 is configured with a controller, which raises a ticket to the management server 106, whenever a cluster is down. The management server 106 transmits an alert associated with the ticket to the resolution system 110. In an embodiment, the management server 106 transmits the alert through a dedicated port, to the resolution system 110. For example, the dedicated port can be port 22 i.e. secured shell port. The resolution system 110 upon receiving the alert, associated with one of the plurality of storage arrays 102-1, 102-2, . . . , 102-M, configured in the ESS 100, verifies the received alert and associated data, identifies an error associated with the alert and resolves the error.

Figure 2:
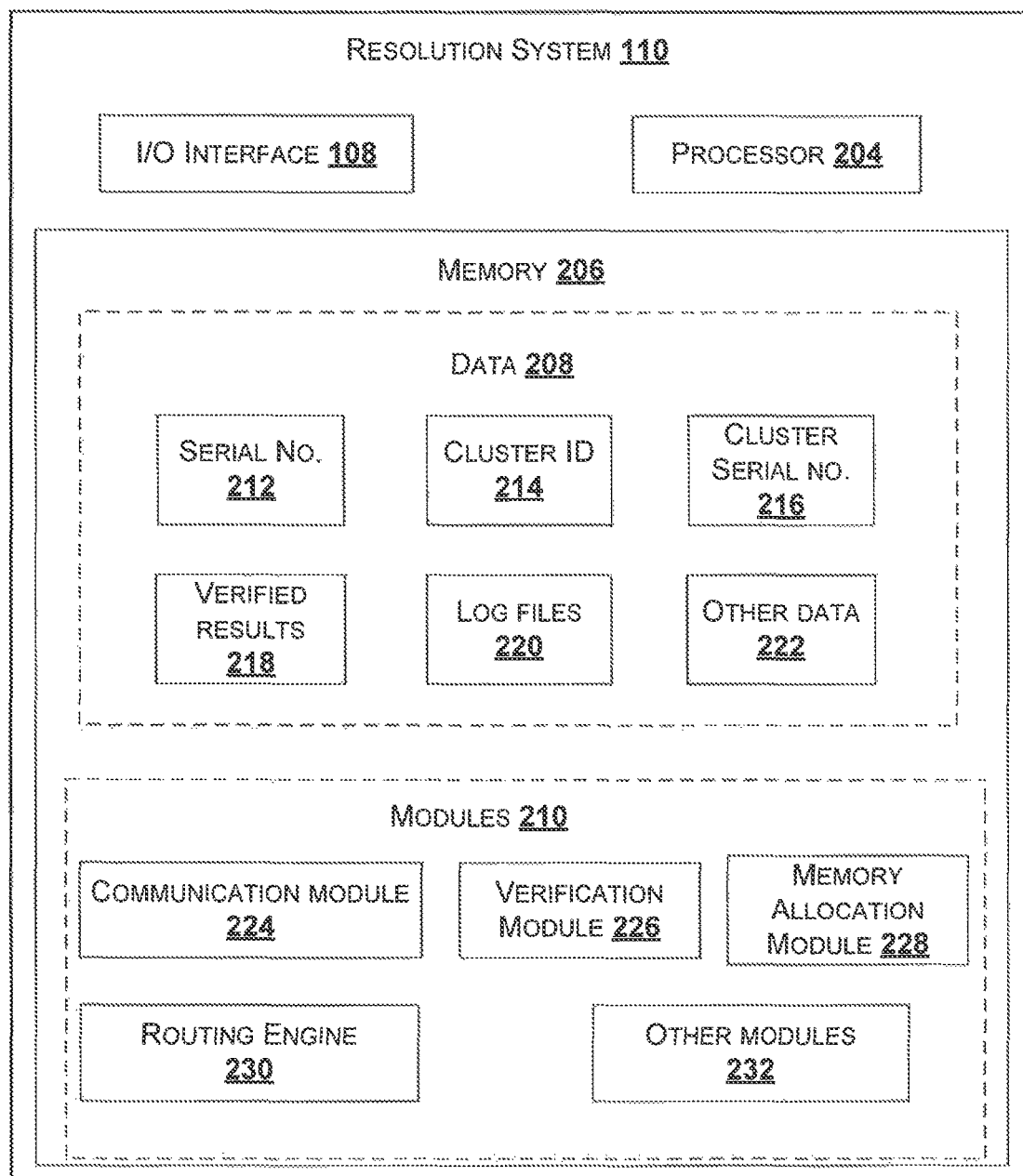
FIG. 2 shows a detailed block diagram illustrating a resolution system for resolving one or more errors in an enterprise storage system in accordance with some embodiments of the present disclosure.

FIG. 2 shows a detailed block diagram illustrating a resolution system 110 for resolving one or more errors in the enterprise storage system 100 in accordance with some embodiments of the present disclosure.

The resolution system 110 comprises an I/O interface 108, a processor 204 and a memory 206. The I/O interface 108 may be configured to read and retrieve data from the management server 106. The memory 206 may be communicatively coupled to the processor 204. The processor 204 may be configured to perform one or more functions of the resolution system 110 for resolving one or more errors in the enterprise storage system 100. In one implementation, the resolution system 110 may comprise data 208 and modules 210 for performing various operations in accordance with the embodiments of the present disclosure. In an embodiment, the data 208 may be stored within the memory 208 and may include, without limiting to, serial number 212, cluster identification (ID) 214, cluster serial number 216, verified results 218, log file values 220 and other data 222.

In some embodiments, the data 208 may be stored within the memory 206 in the form of various data structures. Additionally, the data 208 may be organized using data models, such as relational or hierarchical data models. The other data 222 may store data, including temporary data and temporary files, generated by modules 210 for performing the various functions of the resolution system 110.

In some embodiments, a serial number 212, is a value associated with a cluster of one of the plurality of storage arrays 102-1, 102-1, . . . , 102-M. The serial number 212 denotes a sequence of an alert received by the resolution system 110, from the management server 106. A cluster identification (ID) 214 and cluster serial number 216 are associated with a cluster, of the storage array 102-1, 102-1, . . . , 102-M. Verified results 218 is obtained based on the verification of the cluster serial number 216 i.e. true, if the cluster exists with correct values of cluster ID 214 and cluster serial number 216, else false if the cluster details do not match with any data of the internal database.

In some embodiment, the data 208 may be processed by one or more modules 210 of the resolution system 110. In some implementation, the one or more modules 210 may be stored with the memory 206. In another implementation, the one or more modules 210 may be communicatively coupled to the processor 204 for performing one or more functions of the resolution system 110. The modules 210 may include, without limiting to, a communication module 224, a verification module 226, a memory allocation module 228, a routing engine 230 and other modules 232.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 232 may be used to perform various miscellaneous functionalities of the resolution system 110. In one embodiment, a battery backup unit (BBU) (not shown) is configured in the resolution system to provide backup power to the resolution system 110. It will be appreciated that such modules 232 may be represented as a single module or a combination of different modules.

In some embodiment, the communication module 224 may be responsible for receiving one or more alerts from the management server 106. The communication module 224 interacts with the management server 106 through the I/O interface 108 and receives one or more alerts from the management server 106. The one or more alerts is associated with an error in one of the plurality of storage arrays 102, configured in the enterprise storage system 100. Also, the communication module 224 transmits data associated with the resolution of the one or more alerts, to the management server 106, through the I/O interface 108.

In some embodiment, the verification module 226 may be responsible for verifying one or more parameters associated with at least an alert from the one or more alerts, using an internal database configured in the resolution system 110. The one or more parameters is one of the serial number 212, the cluster identification (ID) 214, and the cluster serial number 216. The internal database comprises a tabular column with the serial number 212, the cluster ID 214, and the cluster serial number 216 associated with each of plurality of the storage arrays 102 configured in the enterprise storage system 100. Each of the one or more parameters associated with the alert is verified with each data stored in the internal database to generate a verified result 218.

For example, consider the one or more parameters associated with an alert of the one or more alerts, received from the management server 106, are as shown in Table 1.

TABLE 1

| Sl. No | Cluster serial number 216 | Cluster ID 214 |
|---|---|---|
| 1 | 000112782256 | 0001 |
| 2 | 000112783342 | 0004 |

The verification module 226 compares the parameters of Table 1, with a corresponding parameter, stored in the internal database. If the cluster ID 214 and the cluster serial number 216 associated with serial number (Sl. No.) 1 of the Table 1, matches with the corresponding values of the internal database, then the verification module 226 generates a verified result as true. If the cluster ID 214 and the cluster serial number 216 associated with serial number (Sl. No.) 1 of the Table 1 do not match with any of the corresponding values of the internal database, then the verification module 226 generates a verified result as false. If the verified result is false, a request is sent to the management server 106 for further investigation.

In an embodiment, the memory allocation module 228 is responsible for allocating a portion of memory in the resolution system 110, based on the verified result 218. The portion of memory is used to store data associated with the one or more parameters. In one embodiment, the data associated with one or more parameters may be log files 220.

In an embodiment, the routing engine 230 is responsible for identifying one or more root causes for an error in one of the plurality of storage arrays 102 and resolving identified one or more root causes of the error, using one or more error resolving processes. After the portion of memory is allocated, the routing engine 230 identifies and resolves one or more root causes of an error, associated with the received alert.

Figure 3A:
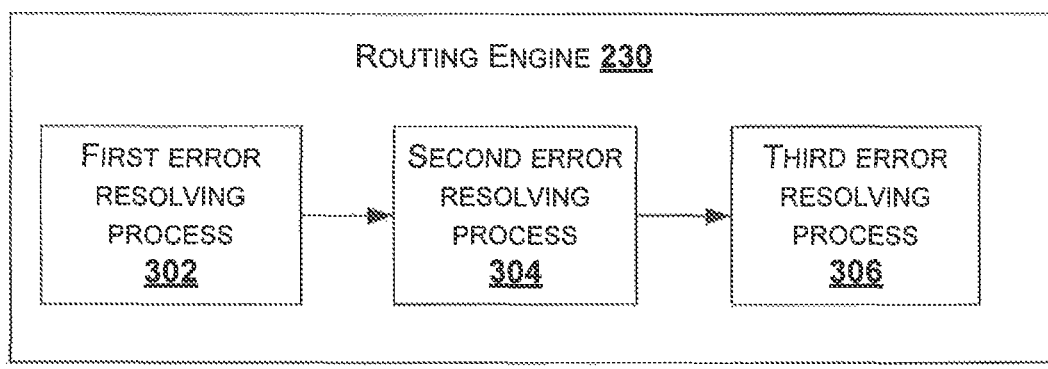
FIG. 3A illustrates a block diagram of routing engine in accordance with few embodiments of the present disclosure.

The sub modules of the routing engine 230 are illustrated in FIG. 3A. The sub modules of the routing engine 230 comprises a first error resolving process 302, a second error resolving process 304 and a third error resolving process 306.

The first error resolving process (FERP) 302 is initiated by the processor 204 of the resolution system 110, upon the allocation of a portion of FERP memory by the memory allocation module 228. The FERP 302 identifies one or more root directories, associated with one of the plurality of storage arrays 102, using the data associated with the one or more parameters. Also, the FERP 302 validates each of the identified one or more root directories using data stored in the portion of FERP memory. Further, the FERP 302 determines one or more root causes of the error based on the validation of the plurality of root directories. Thereafter, the FERP 302 performs at least one of executing an application to resolve the one or more root causes and sending an information associated with the one or more root causes to the management server 106, for resolving the error.

In one embodiment, the second error resolving process (SERP) 304 is initiated by the processor 204 of the resolution system 110, when the FERP 302 is unable to resolve the error associated with the alert. Upon initiating the second error resolving process 304, the processor 204 initiates the memory allocation module 228 to allocate a SERP memory for executing SERP and storing data associated with the execution of SERP 304.

The SERP 304 stores data, associated with the error and data validated by the FERP 302, in the SERP memory. Next, the SERP 304 validates at least one of the stored data in the SERP memory and super user root directories associated with one of the plurality of storage arrays 102, of the enterprise storage system 100. Further, the SERP 304 obtains information associated with disconnection of each component configured in the plurality of storage arrays 102, configured in the enterprise storage system 100, based on the validation. Thereafter, the SERP 304 performs one of rebooting of the storage arrays 102 and sending obtained information associated with disconnection, to a customer also referred as a stakeholder.

In one embodiment, when the SERP 304 is unable to resolve the error associated with the alert, the third error resolving process (TERP) 306 is initiated. Upon initiating the TERP 306, the processor 204 initiates the memory allocation module 228 to allocate a TERP memory for executing TERP 306 and storing data associated with the execution of TERP 306.

The TERP 306 stores data, associated with the error and data validated by the second error resolving process 304, in the TERP memory allocated for the initiated TERP 306 by the resolution system 110. Thereafter, TERP 306 transmits the data, stored in the TERP memory allocated for third error resolving process 306, to the stakeholder.

Figure 3B:
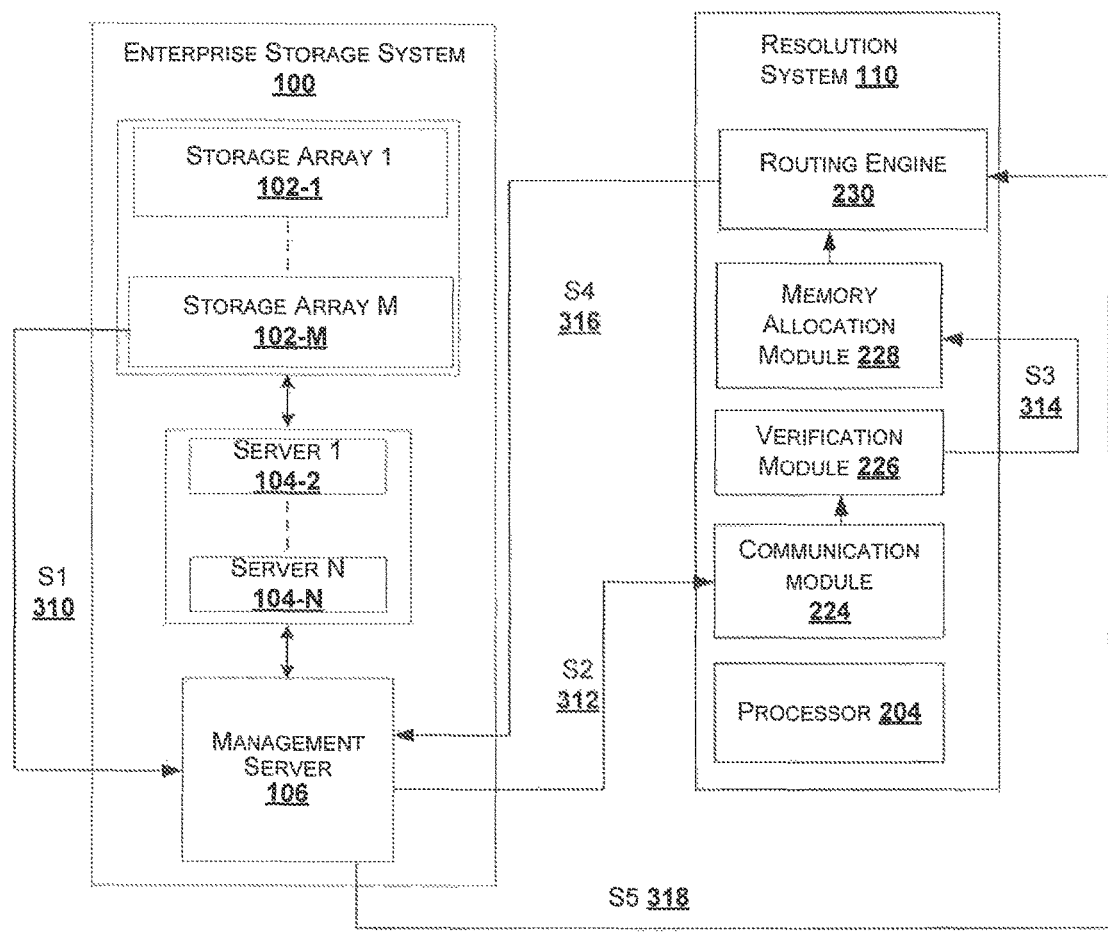
FIG. 3B illustrates a process flow for resolving one or more errors in an enterprise storage system in accordance with an embodiment of the present disclosure.

FIG. 3B illustrates a process flow for resolving one or more errors in an enterprise storage system 100 in accordance with an example embodiment of the present disclosure.

As shown in FIG. 3B, one of the plurality of storage arrays 102 raises a ticket S1 310 with the management server 106, whenever a cluster is down. The management server 106 transmits an alert S2 312 associated with the ticket to the resolution system 110. The management server 106 transmits the alert 312 through a dedicated port, to the resolution system 110. The resolution system 110 upon receiving the alert, verifies the received data associated with the alert 312, and transmits a signal S3 314 to the memory allocation module 228 to enable allocation of a portion of FERP memory. Upon allocating a portion of FERP memory, the allocation module 228 triggers the routing engine 230 to initiate a first error resolving process (FERP) S4 316.

In one exemplary embodiment, the plurality of storage arrays 102 are based on UNIX architecture, so the root system has many directories such as, but not limited to, bin, dev, etc, bin, lib, usr, home and any other directory. The FERP 302 logs into a root folder of the UNIX architecture, for checking all root directory paths, to identify one or more errors. Also, the FERP 302 checks all the directories in the root which has the fault. Once a fault is identified, the FERP 302 further performs the steps to find a resolution either by running a script or by informing the associated customer through an email.

In an example embodiment, FERP 302 of the resolution system 110 finds that the fault is with the device and particularly with an Intelligent Platform Management Interface (IPMI). The FERP 302 identifies whether the alert is outstanding i.e. one of minor and major. If the alert is outstanding, the resolution system 110 transmits an email to the customer, about the alert with a message to check on one of the plurality of storage arrays 102. The email is transmitted for a predefined number of times. For example, if the predefined number of time is three, the email is transmitted for the predefined number of times, until some action is performed by one of the customer and an engineer, i.e. to visit data center to resolve the error. In one embodiment, the action performed to resolve the error may be performing a power cycle automatically by the resolution system 110 by executing script/commands, remotely.

Figure 3C:
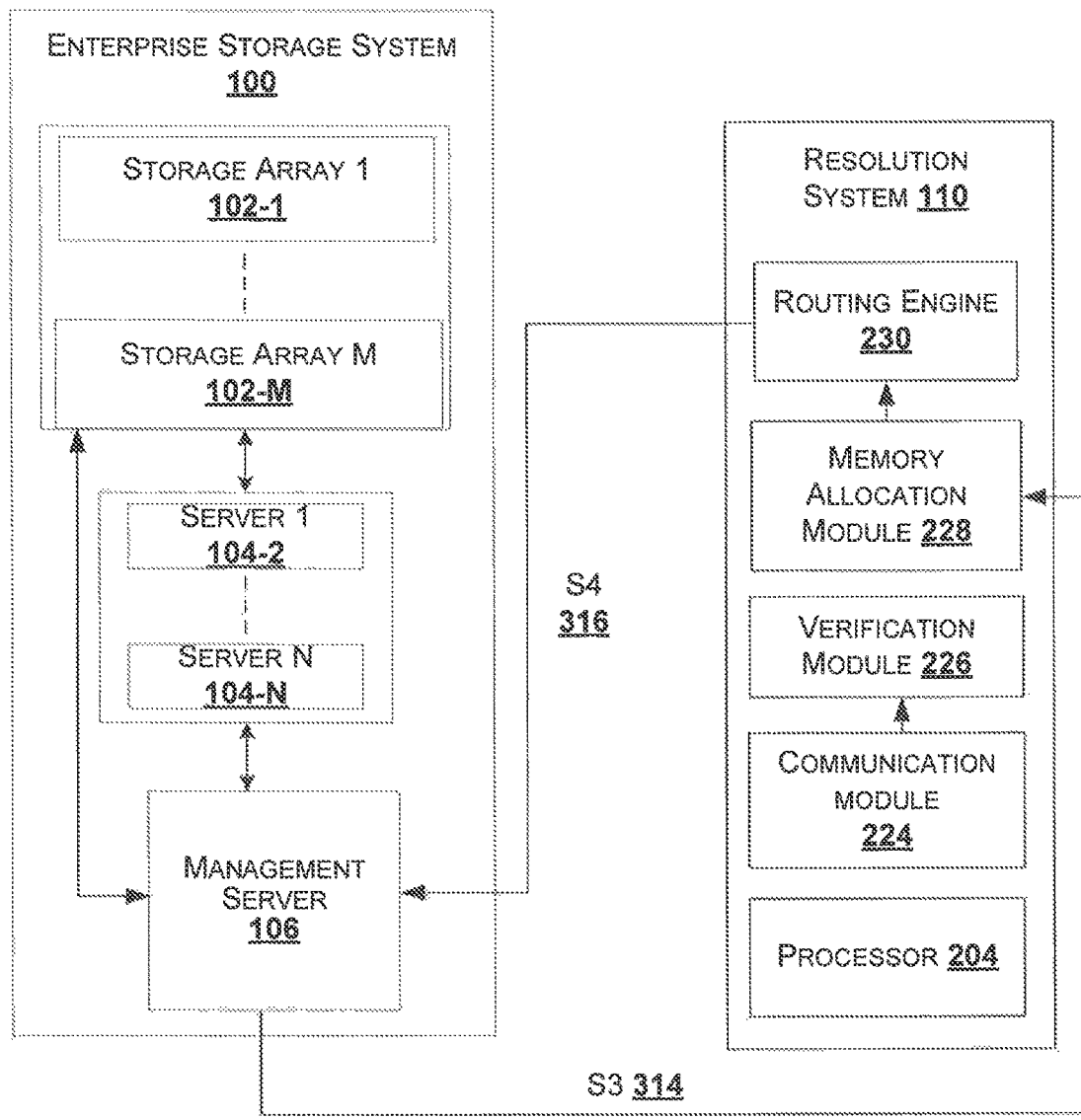
FIG. 3C illustrates another process flow for resolving one or more errors in an enterprise storage system in accordance with another embodiment of the present disclosure.

FIG. 3C illustrates a process flow for resolving one or more errors in an enterprise storage system 100 in accordance with another example embodiment of the present disclosure;

As shown in FIG. 3C, the resolution system 110 initiates a second error resolving process (SERP) 304, when the at least one error is unresolved by the FERP 302, S3 314. The SERP 304 performs other checks, as basic checks are performed by the FERP 302. The SERP 304 checks for any disconnection of a component based on details associated with the component. In an example, the details may include time stamp of the component at which the component got disconnected.

For example, SERP 304 logs in to one of the storage arrays 102. The storage array may be 102-1. The SERP obtains log file from corresponding controllers, configured in the plurality of storage arrays 102. In one embodiment, the SERP 304 logs in as a super root user, and checks all the paths where the disconnected component is located. The SERP 304 navigates to a message log file to identify a time stamp at which the controller got disconnected. Further, the SERP 304 may perform an action based on the time stamp at which the controller got disconnected. In an example, if one of the controllers needs to be manually powered up, the SERP 304 sends information to the customer by an email.

In one embodiment, when the SERP 304 is unable to resolve the error associated with the alert, the third error resolving process (TERP) 306 is initiated. Upon initiating the TERP 306, the processor 204 initiates the memory allocation module 228 to allocate a TERP memory for executing the TERP 306 and storing data associated with the execution of TERP 306. The TERP 306 stores data, associated with the error and data validated by the second error resolving process, in the TERP memory allocated for the initiated TERP 306 by the resolution system 110. Thereafter, the TERP 306 transmits the data, stored in the memory allocated for the TERP 306, to the customer or a stakeholder.

In one embodiment, when the error is unresolved by the SERP 304, the TERP 306 sends a notification to the management server 106 by a signal S2, which further allocates the TERP memory for the processing of the TERP S3 314. The TERP 306 is required where no solution is found in the FERP 302 and the SERP 304. The TERP sends all the log files to the engineer. Further, the engineer may perform an action to resolve the error.

Figure 4:
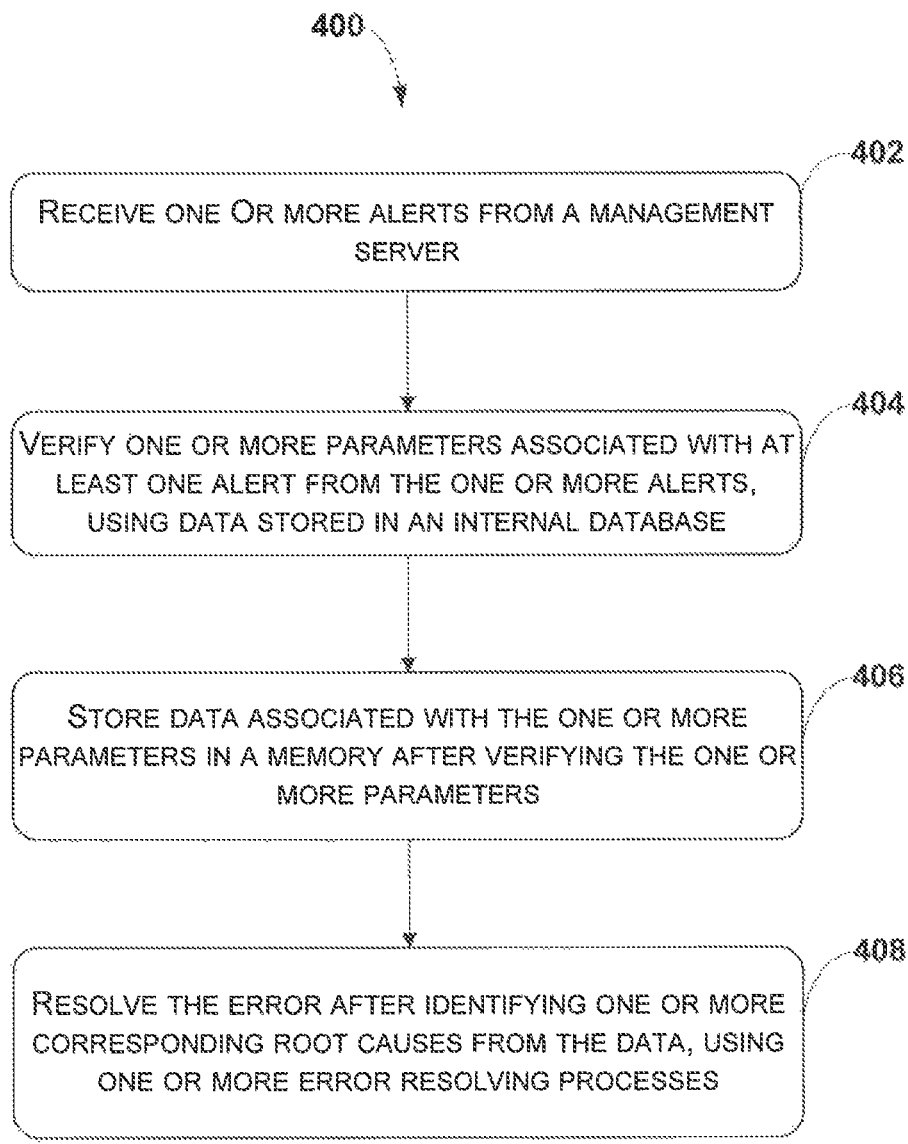
FIG. 4 shows a flowchart illustrating a method for resolving one or more errors in an enterprise storage system in accordance with some embodiments of the present disclosure.

FIG. 4 shows a flowchart illustrating a for resolving one or more errors in an enterprise storage system 100, in accordance with some embodiments of the present disclosure.

As illustrated in FIG. 4, the method 400 comprises one or more blocks for depicting a resolution system 110 for resolving one or more errors in an enterprise storage system 100. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 402, a communication module 224, configured the resolution system 110 receives one or more alerts from a management server 106 configured in the enterprise storage system 100, wherein the one or more alerts are associated with an error of one of the plurality of storage arrays 102-1, 102-2, . . . , 102-M, configured in the enterprise storage system 100. Also, the communication module 224 transmits data associated with the resolution of the one or more alerts, to the management server 106, through the I/O interface 108.

At block 404, a verification module 226 verifies one or more parameters associated with at least one alert from the one or more alerts, using data stored in an internal database configured in the resolution system 110. The one or more parameters is one of serial number 212, cluster identification (ID) 214, and cluster serial number 216. The internal database comprises a tabular column with serial number 212, cluster ID number 214, and cluster serial number 216 associated with each of the plurality of storage arrays 102 configured in the enterprise storage system 100. Each of one or more parameters associated with an alert is verified with each data stored in the internal database to generate a verified result 218.

At block 406, storing of data associated with the one or more parameters in a memory 206, configured in the resolution system 110, after verifying the one or more parameters. The memory allocation module 228 allocates a portion of memory, based on the verified result 218. The portion of memory is used to store data associated the one or more parameters. In one embodiment, the data associated with one or more parameters may be one or more log files 220.

At block 407, the routing engine 230, configured in the resolution system 110, resolves the error after identifying one or more corresponding root causes from the data associated with the one or more parameters, using one or more error resolving processes. The routing engine 230 comprises a first error resolving process 302, second error resolving process 304 and third error resolving process 306.

The first error resolving process (FERP) 302 is upon the allocation of a portion of FERP memory by the memory allocation module 228. The FERP 302 identifies one or more root directories, associated with one of the plurality of storage arrays 102-1, 102-2, . . . , 102-M, using the data associated with the one or more parameters. Also, the FERP 302 validates each of the identified one or more root directories using data stored in the memory. Further, the FERP 302 determines one or more root causes of the error based on the validation of the plurality of root directories. Thereafter, the FERP 302 performs at least one of executing an application to resolve the one or more root causes and sending an information associated with the one or more root causes to the management server 106, for resolving the error.

The second error resolving process (SERP) 304 is initiated by the processor 204 of the resolution system 110, when the FERP 302 is unable to resolve the error associated with the alert. Upon initiating the second error resolving process 304, the memory allocation module 228 allocates a portion of SERP memory for executing SERP and storing data associated with the execution of SERP 304. The SERP 304 stores data, associated with the error and data validated by the FERP 302, in the SERP memory. Also, the SERP 304 validates at least one of the stored data in the SERP memory and super user root directories associated with one of the plurality of storage arrays 102-1, 102-2, . . . , 102-M, of the enterprise storage system 100. Further, the SERP 304 obtains information associated with disconnection of each component configured in the storage arrays 102-1, 102-2, . . . , 102-M, based on the validation. Thereafter, the SERP 304 performs one of rebooting the one of the storage arrays 102-1, 102-2, . . . , 102-M and sending obtained information associated with disconnection, to a stakeholder.

The third error resolving process (TERP) 306 is initiated when the SERP 304 is unable to resolve the error associated with the alert. Upon initiating the TERP 306, the memory allocation module 228 allocates a portion of TERP memory for executing TERP 306 and storing data associated with the execution of TERP 306. The TERP 306 stores data, associated with the error and data validated by the second error resolving process 304, in the TERP memory allocated for the initiated TERP 306 by the resolution system 110. Thereafter, TERP 306 transmits the data, stored in the TERP memory allocated for the TERP 306, to the stakeholder.

Computer System

Figure 5:
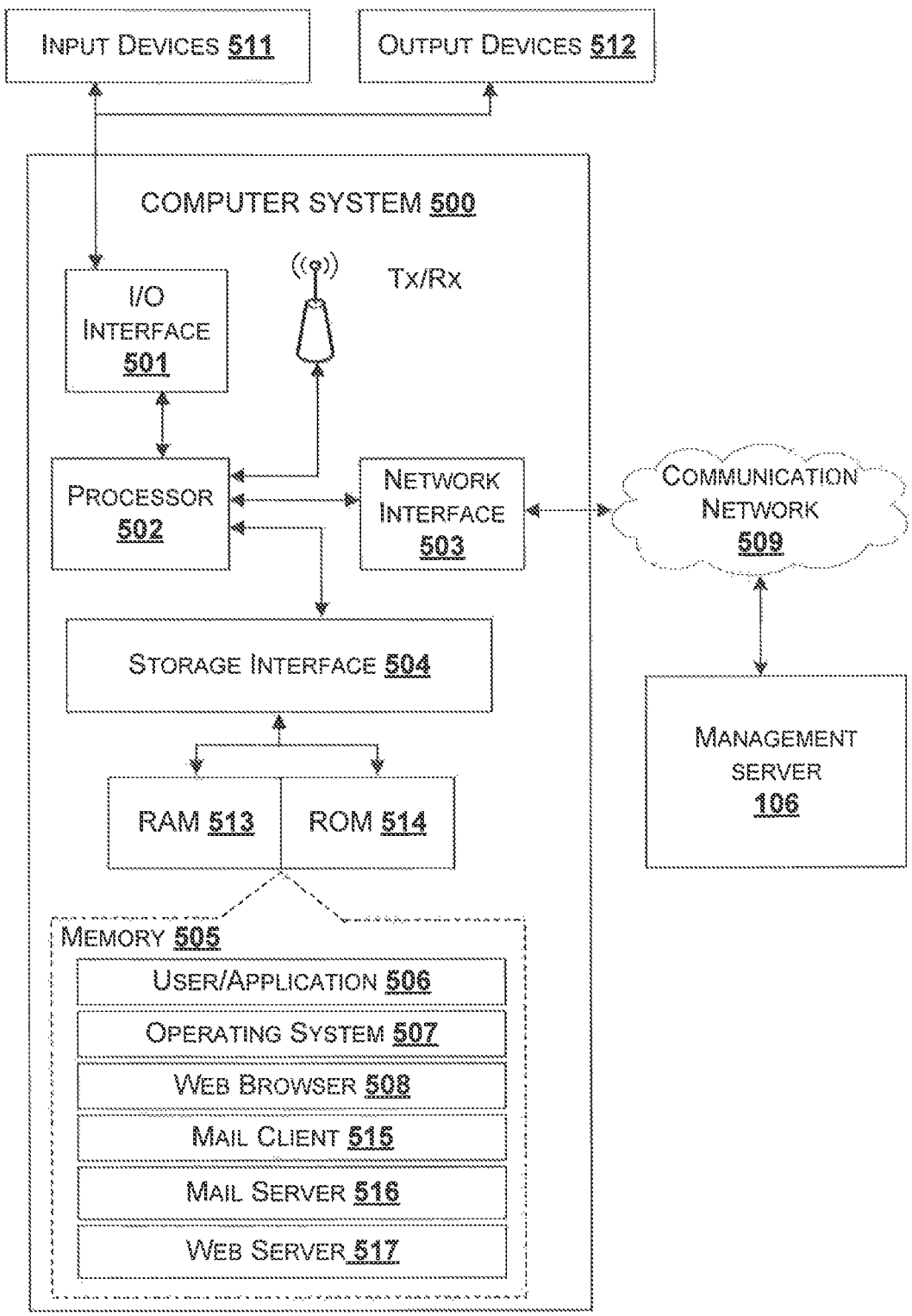
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be a resolution system 110 which is used for resolving one or more errors in an enterprise storage system. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with the management server 106 for receiving one or more alerts, associated an error in a storage array, configured in the enterprise storage system. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure discloses a method for automatically resolving one or more errors of a storage array, configured in an enterprise storage system.

In an embodiment, the method of present disclosure helps in reducing turnaround time for resolving the errors in one of the plurality of storage arrays.

In an embodiment, the method of present disclosure helps in reducing man power required for solving any ticket raised by enterprise storage system.

In an embodiment, the method of present disclosure helps in reducing an overall cost of resolving any errors raised in the enterprise storage system.

In an embodiment, the method of present disclosure helps in saving from DU/DL situations.

In an embodiment, the method of present disclosure helps in synchronizing all different storage arrays from different vendors, thereby avoiding a requirement of support separately for each storage array of the plurality of storage arrays.

In an embodiment, the method of present disclosure monitors whole data center storage system from a single platform.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate or not) may be used in place of a single device/article. Similarly, where more than one device or article is described herein (whether they cooperate or not), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Enterprise storage system |
| 102-1, 102-2 . . . to 102-M | Plurality of storage arrays |
| 104-1, 104-2, . . . to 104-2 | Plurality of servers |
| 106 | Management server |
| 108 | I/O Interface |
| 110 | Resolution system |
| 204 | Processor |
| 206 | Memory |
| 208 | Data |
| 210 | Modules |
| 212 | Serial Number |
| 214 | Cluster ID |
| 216 | Cluster serial number |
| 218 | Verified results |
| 220 | Log files |
| 222 | Other data |
| 224 | Communication module |
| 226 | Verification module |
| 228 | Memory allocation module |
| 230 | Routing engine |
| 232 | Other modules |
| 302 | First error resolving process |
| 304 | Second error resolving process |
| 306 | Third error resolving process |

What is claimed is:

1. A method for resolving one or more errors in an enterprise storage system, the method comprising:

receiving, by a resolution system, one or more alerts from a management server configured in an enterprise storage system, wherein the one or more alerts are associated with an error in one of plurality of storage arrays configured in the enterprise storage system;

verifying, by the resolution system, one or more parameters associated with at least one alert from the one or more alerts, using data stored in an internal database configured in the resolution system, wherein verifying the one or more parameters comprises comparing each of the one or more parameters with the data stored in the internal database, to generate a verified result;

storing, by the resolution system, data associated with the one or more parameters in a memory, configured in the resolution system, after verifying the one or more parameters; and resolving, by the resolution system, the error after identifying one or more corresponding root causes from the data associated with the one or more parameters, using one or more error resolving processes.

2. The method as claimed in claim 1, wherein the one or more alerts are received by the resolution system through a dedicated port, from a corresponding dedicated port, of the management server.

3. The method as claimed in claim 1, wherein the one or more parameters is one of serial number, cluster identification (ID), and cluster serial number.

4. The method as claimed in claim 1, wherein storing the data associated with the one or more parameters in the memory comprises allocating a portion of memory based on the verified result for storing the data associated with the one or more parameters.

5. The method as claimed in claim 1, wherein the data associated with the one or more parameters is at least one log file corresponding to at least one storage array of the plurality of storage arrays.

6. The method as claimed in claim 1, wherein resolving the error comprises initiating a first error resolving process to perform:
identifying one or more root directories, associated with one of the plurality of storage arrays, using the data associated with the one or more parameters;
validating each of the identified one or more root directories using data stored in the memory;
determining one or more root causes of the error based on the validation of the one or more root directories; and
performing at least one of executing an application to resolve the one or more root causes and sending an information associated with the one or more root causes to the management server, for resolving the error.

7. The method as claimed in claim 6 further comprises initiating a second error resolving process, when the error is unresolved by the first error resolving process, to perform:
storing data, associated with the error and data validated by the first error resolving process, in a memory allocated by the resolution system, for the initiated second error resolving process;
validating at least one of the stored data in the memory and super user root directories, associated with one of the plurality of storage arrays, of the enterprise storage system;
obtaining information associated with disconnection of each component configured in the one of the plurality of storage arrays, based on the validation; and
performing one of rebooting the enterprise storage system and sending obtained information associated with the disconnection, to a stakeholder.

8. The method as claimed in claim 7 further comprises initiating third error resolving process, when the error is unresolved by the second error resolving process, to perform:
storing data, associated with the error and data validated by the second error resolving process, in a memory allocated for the initiated third error resolving process by the resolution system; and
transmitting the data, stored in the memory allocated for third error resolving process, to the stakeholder.

9. A resolution system for resolving one or more error in an enterprise storage system, the resolution system comprising:
a processor; and
a memory, communicatively coupled to the processor, wherein the memory stores processor-executable instructions, which, on execution, causes the processor to:
receive one or more alerts from a management server configured in an enterprise storage system, wherein the one or more alerts are associated with an error in one of a plurality of storage arrays configured in the enterprise storage system;
verify one or more parameters associated with at least one alert from the one or more alerts, using data stored in an internal database configured in the resolution system, wherein verifying the one or more parameters comprises comparing each of the one or more parameters with the data stored in the internal database, to generate a verified result;
store data associated with the one or more parameters in a memory, configured in the resolution system, after verifying the one or more parameters; and
resolve the error after identifying one or more corresponding root causes from the data associated with the one or more parameters, using one or more error resolving processes.

10. The system as claimed in claim 9, wherein a dedicated port configured in the resolution system receives one or more alerts from a corresponding dedicated port, of the management server.

11. The system as claimed in claim 9, wherein the one or more parameters is one of serial number, cluster identification (ID), and cluster serial number.

12. The system as claimed in claim 9, wherein to store the data associated with the one or more parameters in the memory, the instructions cause the processor to allocate a portion of memory based on the verified result to store the data associated with the one or more parameters.

13. The system as claimed in claim 9, wherein the data associated with the one or more parameters is at least one log file corresponding to at least one storage array of the plurality of storage arrays.

14. The system as claimed in claim 9, wherein to resolve the error, the instructions cause the processor to initiate a first error resolving process to:
identify one or more root directories, associated with one of the plurality of storage arrays, using the data associated with the one or more parameters;
validate each of the identified one or more root directories using data stored in the memory;
determine one or more root causes of the error based on the validation of the one or more root directories; and
perform at least one of executing an application to resolve the one or more root causes and sending an information associated with the one or more root causes to the management server, for resolving the error.

15. The system as claimed in claim 14, wherein the instructions further cause the processor to initiate a second error resolving process, when the error is unresolved by the first error resolving process, to:
store data, associated with the error and data validated by the first error resolving process, in a memory allocated by the resolution system, for the initiated second error resolving process;
validate at least one of the stored data in the memory and super user root directories, associated with one of the plurality of storage arrays, of the enterprise storage system;
obtain information associated with disconnection of each component configured in the one of the plurality of storage arrays, based on the validation; and
perform one of rebooting the enterprise storage system and sending obtained information associated with the disconnection, to a stakeholder.

16. The system as claimed in claim 15, wherein the instructions further cause the processor to initiate a third error resolving process, when the error is unresolved by the second error resolving process, to:
store data, associated with the error and data validated by the second error resolving process, in a memory allocated for the initiated third error resolving process by the resolution system; and
transmit the data, stored in the memory allocated for third error resolving process, to the stakeholder.

17. A non-transitory computer readable medium including instructions stored thereon that when processed by at least one processor cause a resolution system to perform acts of:
receiving one or more alerts from a management server configured in an enterprise storage system, wherein the one or more alerts are associated with an error in one of plurality of storage arrays configured in the enterprise storage system;

verifying one or more parameters associated with at least one alert from the one or more alerts, using data stored in an internal database configured in the resolution system, wherein verifying the one or more parameters comprises comparing each of the one or, more parameters with the data stored in the internal database, to generate a verified result;

storing data associated with the one or more parameters in a memory, configured in the resolution system, after verifying the one or more parameters; and resolving the error after identifying one or more corresponding root causes from the data associated with the one or more parameters, using one or more error resolving processes.

* * * * *